United States Patent
Lee

(10) Patent No.: US 8,164,784 B2
(45) Date of Patent: *Apr. 24, 2012

(54) APPARATUS AND METHOD FOR SETTING PRINTING OPTIONS USING PREVIEW IMAGE

(75) Inventor: Hee-Jin Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/067,652

(22) Filed: Jun. 17, 2011

(65) Prior Publication Data

US 2011/0249279 A1 Oct. 13, 2011

Related U.S. Application Data

(63) Continuation of application No. 11/498,823, filed on Aug. 4, 2006, now Pat. No. 7,990,568.

(30) Foreign Application Priority Data

Sep. 16, 2005 (KR) .................. 10-2005-0086997

(51) Int. Cl.
*G06K 1/00* (2006.01)
*G06K 15/00* (2006.01)

(52) U.S. Cl. ........................ 358/1.2; 358/1.18

(58) Field of Classification Search .............. 358/1.1, 358/1.13, 1.18, 1.2
See application file for complete search history.

(56) References Cited

U.S. PATENT DOCUMENTS

| | | | |
|---|---|---|---|
| 5,162,918 A | 11/1992 | Muramatsu | |
| 5,416,605 A | 5/1995 | Hideshima et al. | |
| 5,937,232 A | 8/1999 | Taguchi et al. | |
| 2004/0196499 A1 | 10/2004 | Livingston | |
| 2006/0077415 A1 | 4/2006 | Bhattacharjya et al. | |
| 2007/0127073 A1* | 6/2007 | Goel et al. | 358/1.18 |
| 2007/0273895 A1* | 11/2007 | Cudd et al. | 358/1.1 |

FOREIGN PATENT DOCUMENTS

| | | |
|---|---|---|
| JP | 05-028134 | 2/1993 |
| JP | 2003-233491 | 8/2003 |
| JP | 2004-282439 | 10/2004 |
| KR | 10-2005-0035115 | 4/2005 |

OTHER PUBLICATIONS

MS Power Point 2003.*
MS Word 2003.*

* cited by examiner

*Primary Examiner* — Benny Tieu
*Assistant Examiner* — Eric A Rust
(74) *Attorney, Agent, or Firm* — Roylance, Abrams, Berdo & Goodman, L.L.P.

(57) ABSTRACT

An apparatus and method are provided for setting a printing option using a preview image. Setting the printing option includes an image preview unit displaying a preview image corresponding to printing data and enabling the preview image to be manipulated for setting a printing setting, a control unit controlling printing of the preview image according to the printing setting of the manipulated preview image, and a printing option setting unit setting a printing option, wherein the control unit applies the printing setting of the preview image to the printing option of the printing option setting unit.

11 Claims, 15 Drawing Sheets

A4
210 x 297 mm

A6
148 x 210 mm

A6
105 x 148 mm

A4
210 x 297 mm

A4
Reduce 70%

A4
Reduce 50%

APPARATUS AND METHOD FOR SETTING PRINTING OPTIONS USING PREVIEW IMAGE

PRIORITY

This application is a continuation application under 35 U.S.C. §120 of U.S. Non-provisional patent application Ser. No. 11/498,823, filed on Aug. 4, 2006 now U.S. Pat. No. 7,990,568 in the U.S. Patent and Trademark Office, the entire disclosure of which is incorporated herein by reference. Additionally, this application claims the benefit under 35 U.S.C. §119(a) of Korean Patent Application No. 10-2005-0086997, filed Sep. 16, 2005, in the Korean Intellectual Property Office, the entire disclosure of which is hereby incorporated by reference.

BACKGROUND OF THE INVENTION

1. Field of the Invention

The present invention relates to an apparatus and method for setting a printing option using a preview image. More particularly, the present invention relates to an apparatus and method for setting a printing option by manipulating a preview image and setting the printing option according to the manipulated preview image.

2. Description of the Related Art

To change printer settings, a user has to click a tab button to open a printer setting window and then change the necessary print options. FIG. 1 shows a conventional printer setting screen and a preview screen. Referring to FIG. 1, an option setting screen of a Layout tab button 10 and a corresponding PREVIEW screen 12 are shown.

FIG. 2 shows a conventional n-up option selecting screen and a corresponding PREVIEW screen 22 when the n-up option is used. Referring to FIG. 2, a Graphics tab button 20 is clicked to select the n-up option. As illustrated by FIG. 2, 2-up printing can be performed by selecting "Multiple Pages per Side" from a Type pop-up menu and selecting "2" from a Page per Side pop-up menu in a Layout Options section. After 2-up printing is set by selecting the corresponding options, the 2-up printing option is also checked in the PREVIEW screen to show a preview of the printout according to the 2-up printing option.

Using traditional print setting options, users can have difficulties setting the printing options in the printer setting window. Therefore, most of the useful options provided in the printer setting window may be not be accessed by the user. Furthermore, the user has to click several tab buttons to find the desired printing options.

SUMMARY OF THE INVENTION

The present invention provides an apparatus and method for setting a printing option using a preview image to facilitate change and use of printing options using a simple interface by manipulating the preview image and setting the printing options according to the printing settings of the manipulated preview image.

According to an aspect of exemplary embodiments of the present invention, an apparatus is provided for setting a printing option using a preview image. The apparatus includes an image preview unit displaying a preview image corresponding to printing data and enabling the preview image to be manipulated, a control unit controlling printing of the image according to the printing setting of the manipulated preview image, and a printing option setting unit setting a printing option, wherein the control unit applies the printing setting of the preview image to the printing option of the printing option setting unit.

In an exemplary implementation, the image preview unit can allow the preview image to be manipulated using an input device including a mouse, a keyboard, and a pen.

Printing setting values of the preview image can include printing option values available using the printing option setting unit.

Exemplary embodiments of the present invention can be embodied using a printer driver or a separate host application.

In another exemplary implementation, when the preview image is manipulated, an icon with a corresponding function can appear beside the preview image.

In another exemplary implementation, the shape of a mouse pointer can vary for the manipulation of the preview image.

According to another aspect of exemplary embodiments of the present invention, a method is provided for setting a printing option using a preview image The method includes displaying a preview image corresponding to printing data, manipulating the preview image to set a printing option, and printing according to the printing setting of the manipulated preview image.

In an exemplary implementation, the printing option of the preview image can be set as a printing option of a printing option user interface.

Printing setting values of the preview image can include printing option values available using the printing option user interface.

The method may be embodied in a printer driver or a separate host application.

In another exemplary implementation, when the preview image is manipulated, an icon with a corresponding function may appear beside the preview image.

In another exemplary implementation, the shape of a mouse pointer can vary for the manipulation of the preview image.

Manipulation of the preview image can be performed using an input device including a mouse, a keyboard, and a pen.

BRIEF DESCRIPTION OF THE DRAWINGS

The above and other aspects, exemplary features and advantages of the present invention will become more apparent from the following detailed description of certain exemplary embodiments thereof when taken in conjunction with the accompanying drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
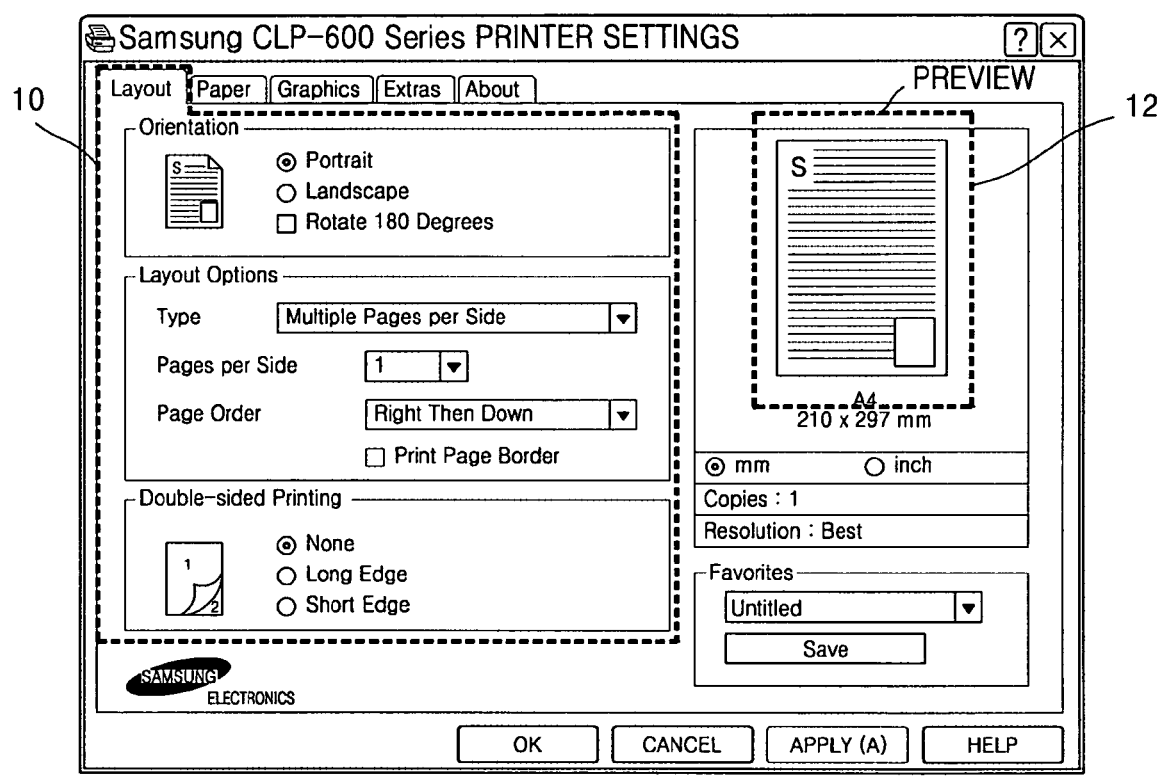
FIG. 1 shows a conventional printer setting screen and a PREVIEW screen.
Figure 2:
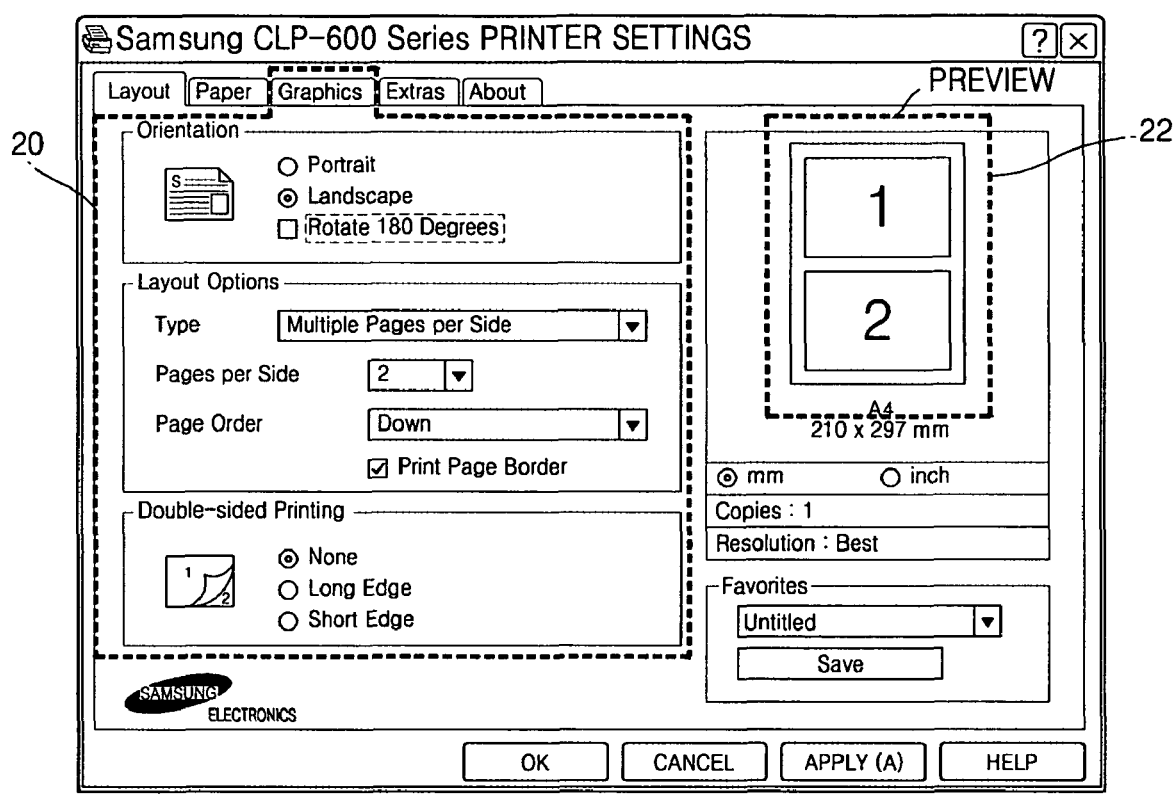
FIG. 2 shows a conventional n-up option selecting screen and a corresponding PREVIEW screen when the n-up option is used.
Figure 3:
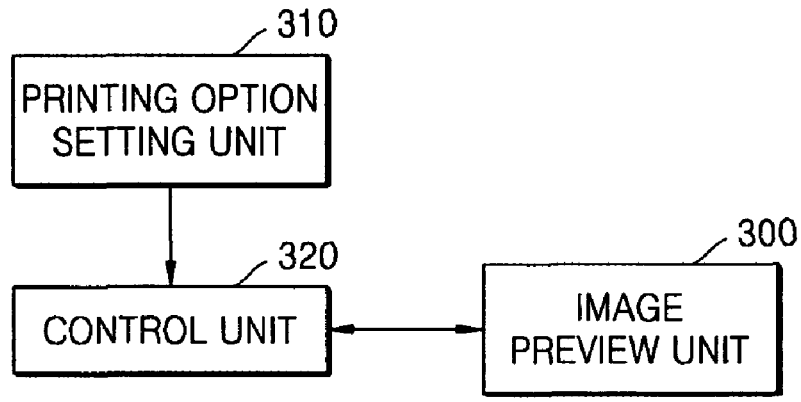
FIG. 3 is a block diagram showing an apparatus for setting a printing option using a preview image according to an exemplary embodiment of the present invention.

FIG. 3 is a block diagram showing an apparatus for setting a printing option using a preview image according to an exemplary embodiment of the present invention. Referring to FIG. 3, the apparatus includes an image preview unit 300, a printing option setting unit 310, and a control unit 320.

The image preview unit 300 displays a preview image. Further, the image preview unit 300 enables the preview image to be manipulated for setting a printing setting. The image preview unit 300 enables the preview image to be manipulated by a user using, for example, a mouse, a keyboard, a pen, or the like. The preview image can be rotated 360 degrees in left or right directions about an axis.

Furthermore, the image preview unit 300 enables manipulation of the preview image for setting paper size, font size and ratio, and an n-up printing option.

The printing option setting unit 310 displays set printing options. Further, the printing options can be changed by altering option values of the printing option setting unit 310.

The image preview unit 300 and the printing option setting unit 310 can be embodied in a single user interface or in separate user interfaces.

The control unit 320 sets printing options according to printing settings of the manipulated preview image, and the control unit 320 controls the printing option setting unit 310 to display the set printing options. If a plurality of printing settings is changed using the image preview unit 300, the control unit 320 sets a plurality of printing options according to the changed printing settings and controls the printing option setting unit 310 to display the plurality of printing options.

Further, if the printing option is changed by directly using the printing option setting unit 310, the control unit 320 controls the image preview unit 300 to display a preview image to which the changed printing option is applied.

Figure 4:
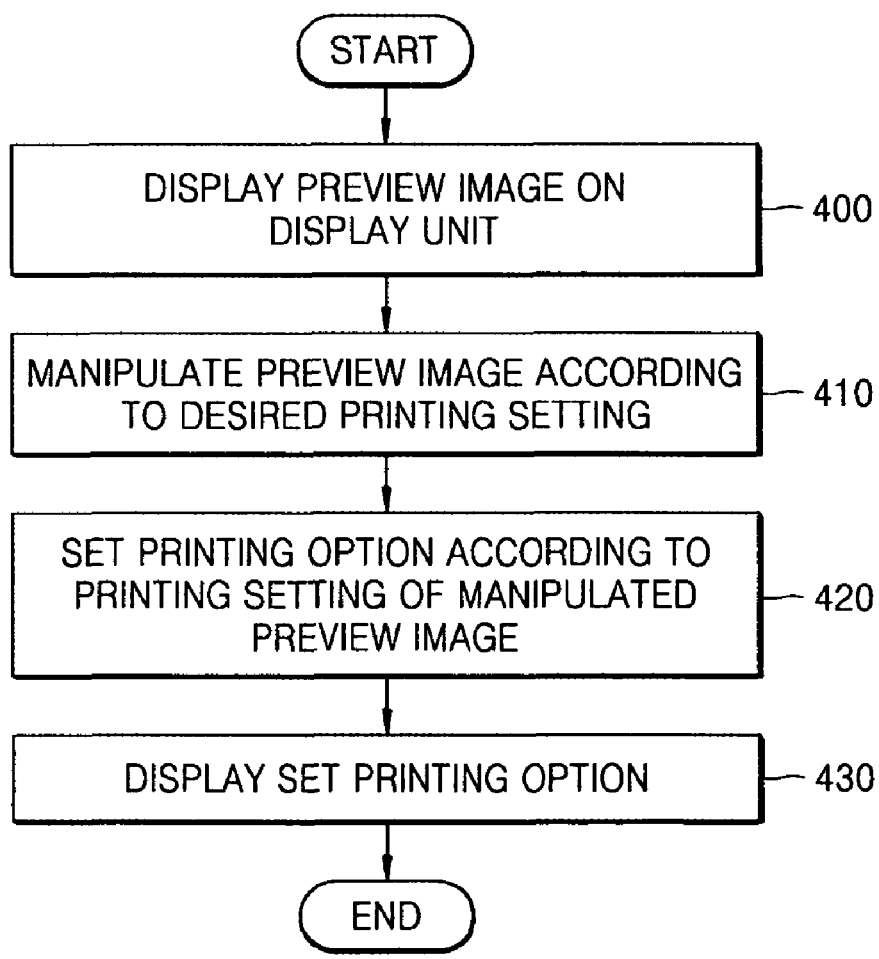
FIG. 4 is a flowchart showing a method for setting a printing option using a preview image according to an exemplary embodiment the present invention.

FIG. 4 is a flowchart showing a method for setting a printing option using a preview image according to an exemplary embodiment the present invention. The method of FIG. 4 will now be described in association with FIG. 3.

Referring to FIGS. 3 and 4, when printing data exist, a preview image corresponding to printing data is displayed on the image preview unit 300 (step 400). A user manipulates the preview image using the image preview unit 300 for setting desired printing settings (step 410). For example, the printout orientation can be changed from Portrait to Landscape by rotating the preview image by 90 degrees about an axis. Further, paper size can be changed by clicking the corner of the preview image to activate the preview image and dragging the corner of the preview image to a desired size.

After the preview image is manipulated, the control unit 320 sets printing options according to the printing settings of the manipulated preview image (step 420).

After the control unit 320 sets the printing options, the printing option setting unit 310 displays the set printing options (step 430). Further, printing options can also be set using the printing option setting unit 310.

The method of setting printing options using the preview image will now be described according to an exemplary embodiment of the present invention.

Figure 5A:
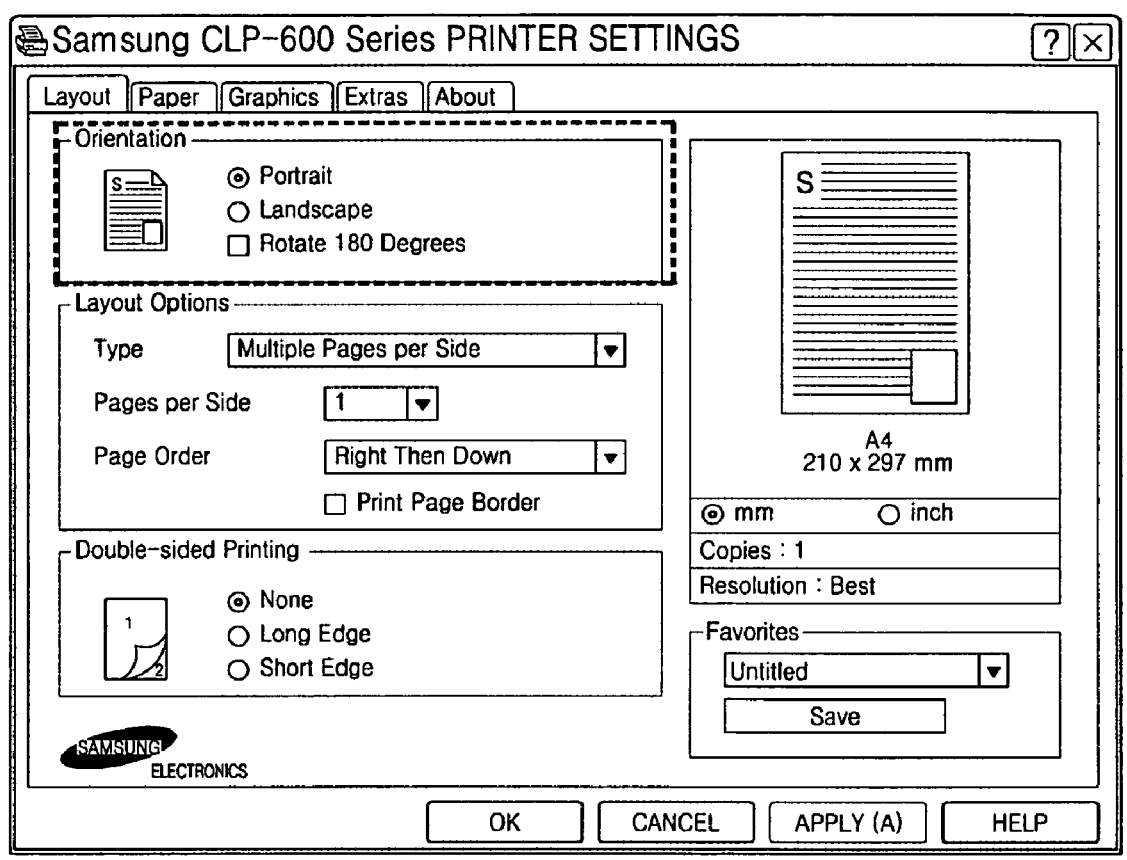
FIGS. 5A to 5C show examples of manipulating a preview image for changing printing orientation from Portrait to Landscape according to an exemplary embodiment the present invention.
Figure 5B:
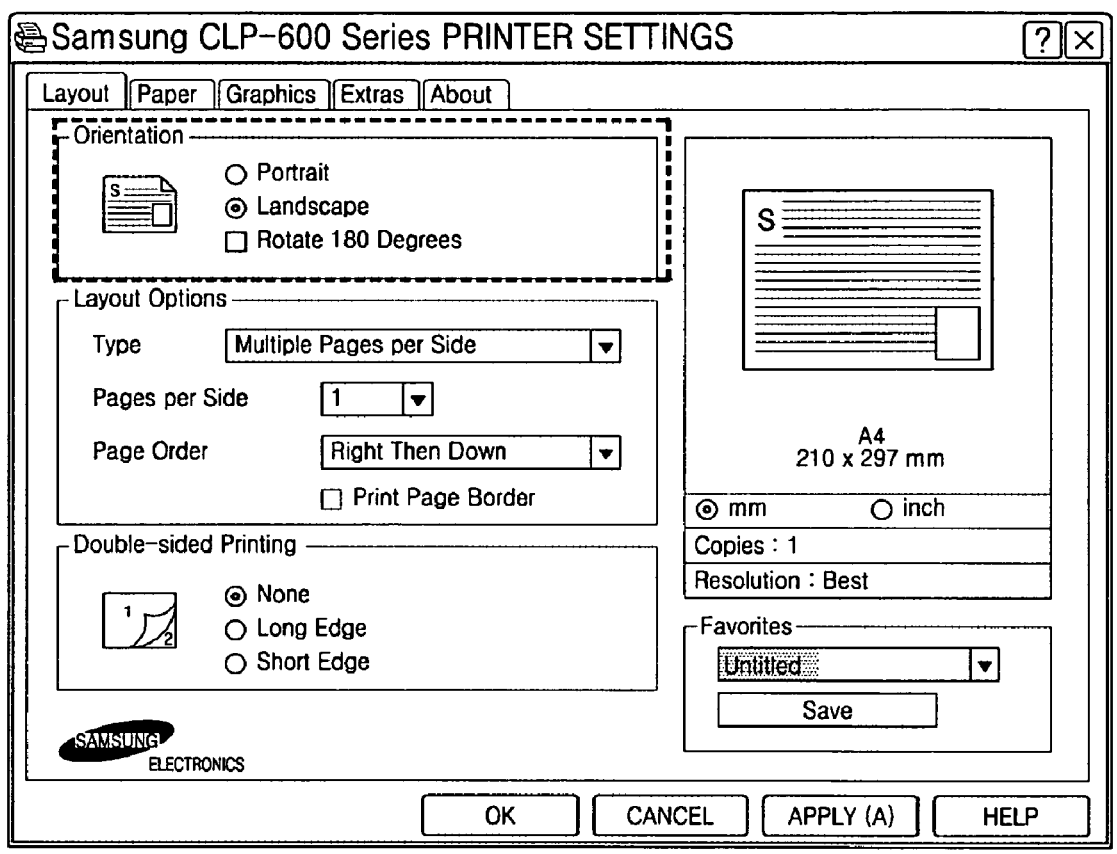
Figure 5C:
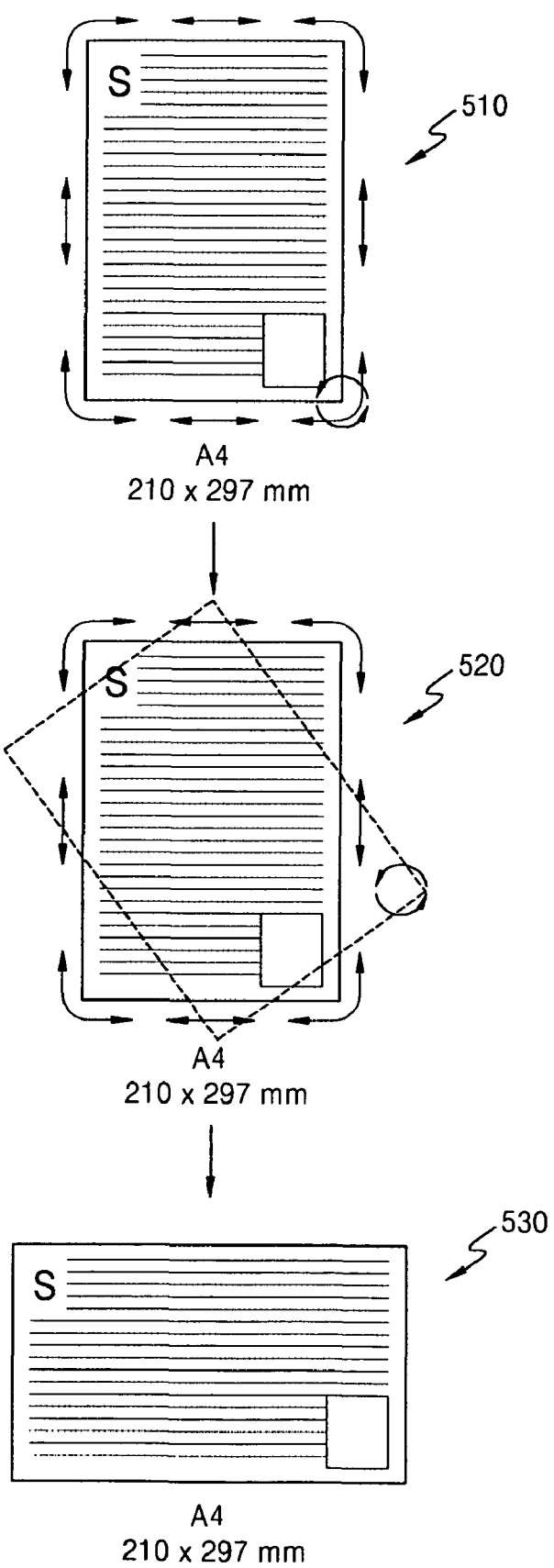

FIGS. 5A to 5C show examples of manipulating a preview image for changing printing orientation from Portrait to Landscape according to an exemplary embodiment the present invention.

Referring to FIGS. 5A to 5C, a preview image is displayed on a preview screen of a printer setting window shown in FIG. 5A, and the preview image can be rotated right or left about an axis 510. The preview image is activated when one of the four corners of the preview image is selected, and the preview image can be rotated by dragging the corner 520. When the preview image is rotated by 90 degrees, printing is performed after changing a printing option from Portrait to Landscape 530.

When the printing option is changed by manipulation of the preview image, the changed printing option is displayed on the printing option setting unit 310 of the printer setting window as shown in FIG. 5B. The manipulated preview screen corresponds to the image preview unit 300 shown in FIG. 3.

Figure 6A:
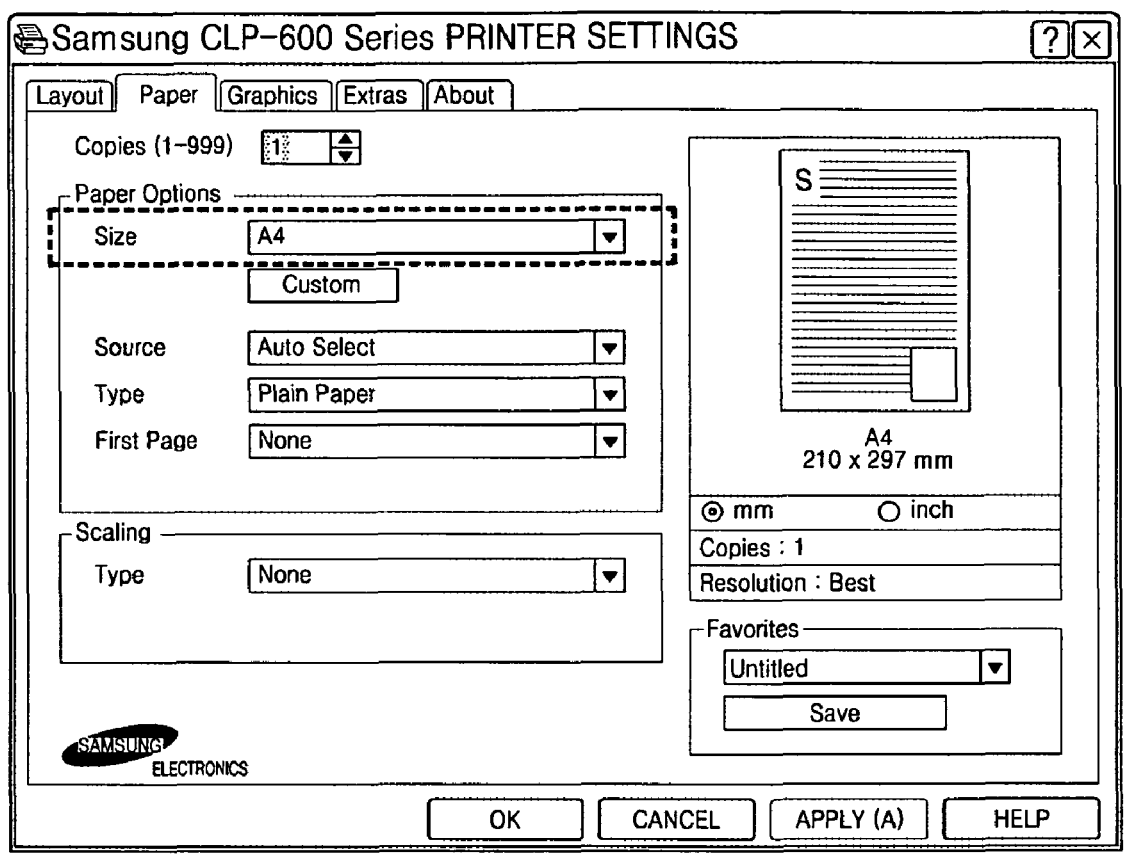
FIGS. 6A to 6C show examples of manipulating a preview image for changing a paper size according to an exemplary embodiment of the present invention.
Figure 6B:
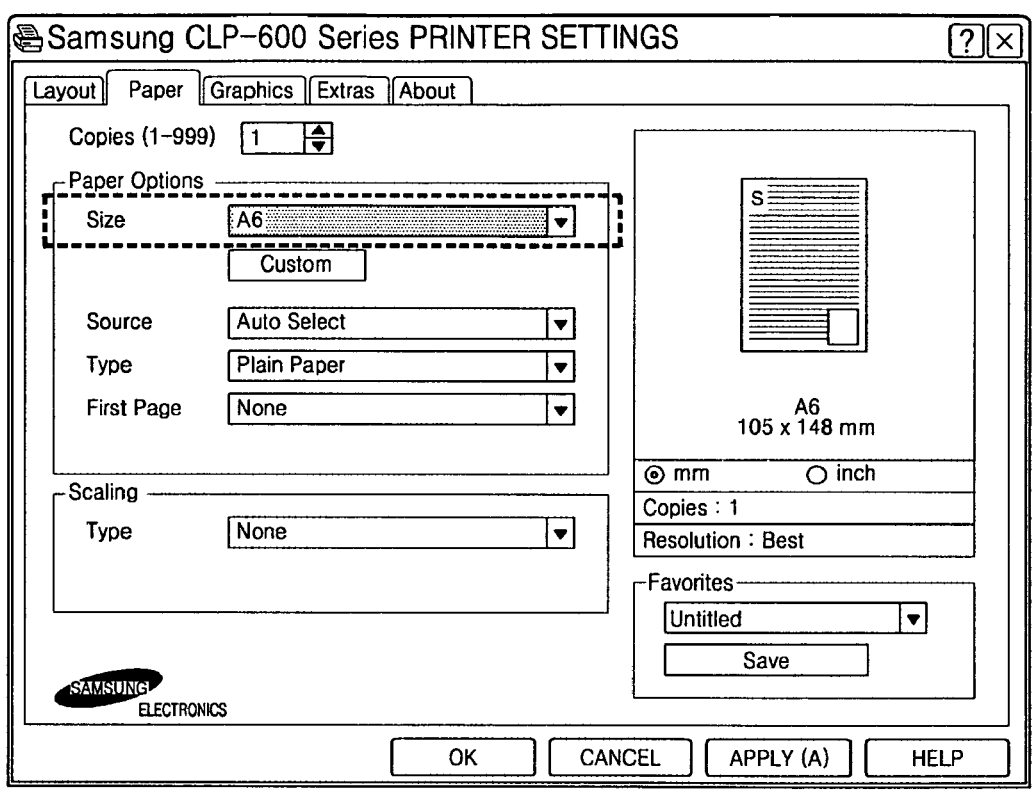
Figure 6C:
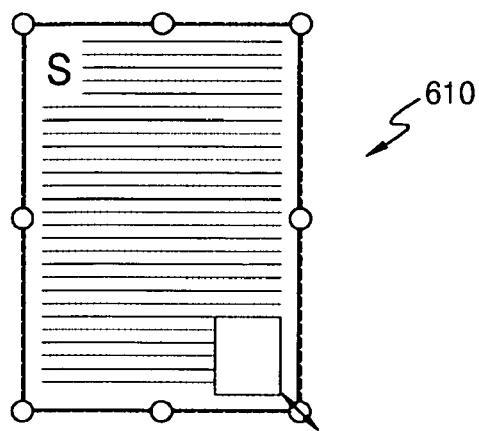
Figure 6C:
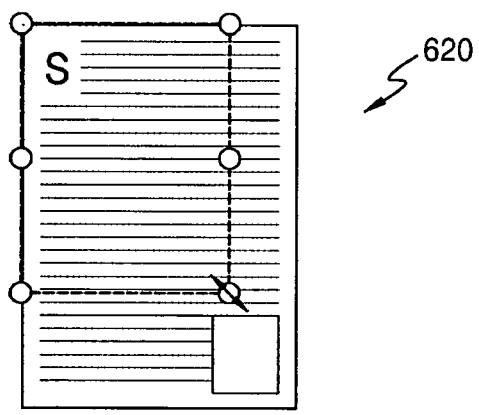
Figure 6C:
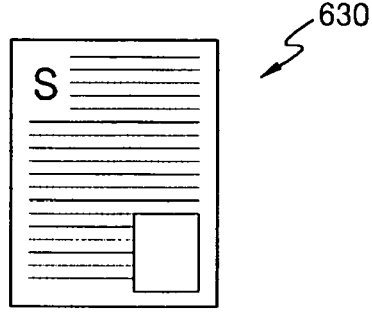

FIGS. 6A to 6C show examples of manipulating a preview image for changing a paper size according to an exemplary embodiment of the present invention.

Referring to FIGS. 6A to 6C, the paper size can be changed using a preview image displayed on a preview screen of a printer setting window shown in FIG. 6A 610. The preview image is activated when one of the four corners of the preview image is clicked, and then the paper size can be changed to a desired size by dragging the corner of the preview image 620.

When the mouse pointer is moved out of the preview image, after the preview image is dragged to the desired paper size, printing is performed according to the changed paper size 630.

When the printing option is changed by manipulation of the preview image, the changed printing option is displayed on the printing option setting unit 310 of the printer setting window as shown in FIG. 6B. Referring to FIG. 6B, the paper size is changed to A6.

Figure 7A:
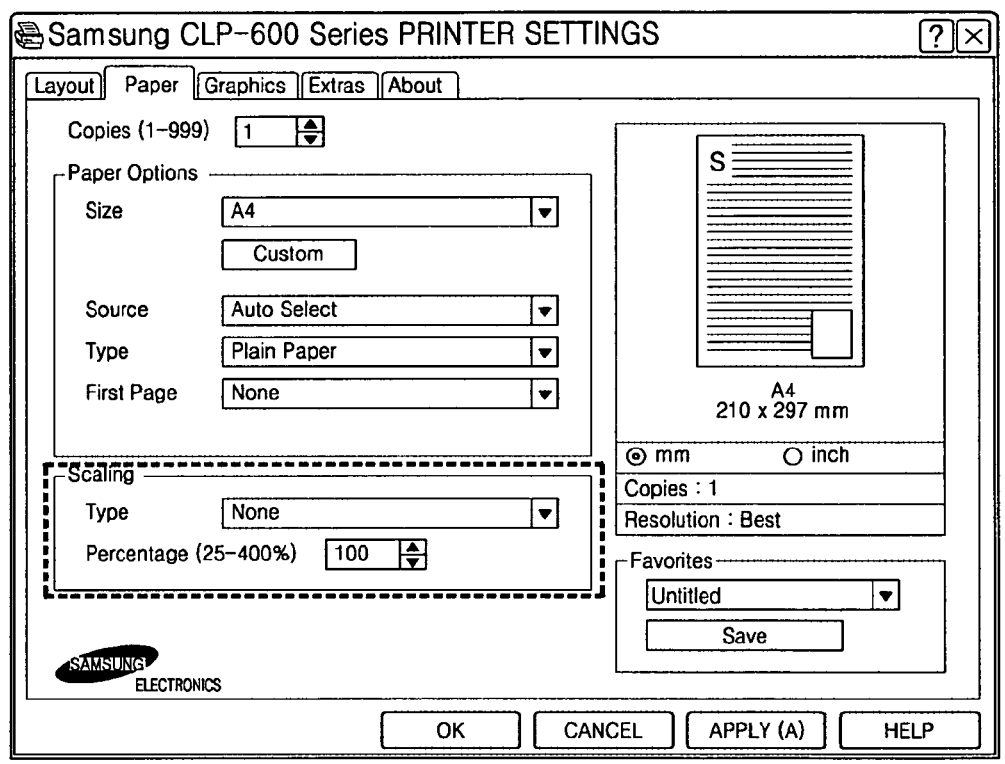
FIGS. 7A to 7C show examples of manipulating a preview image for changing a printing scale according to an exemplary embodiment of the present invention.
Figure 7B:
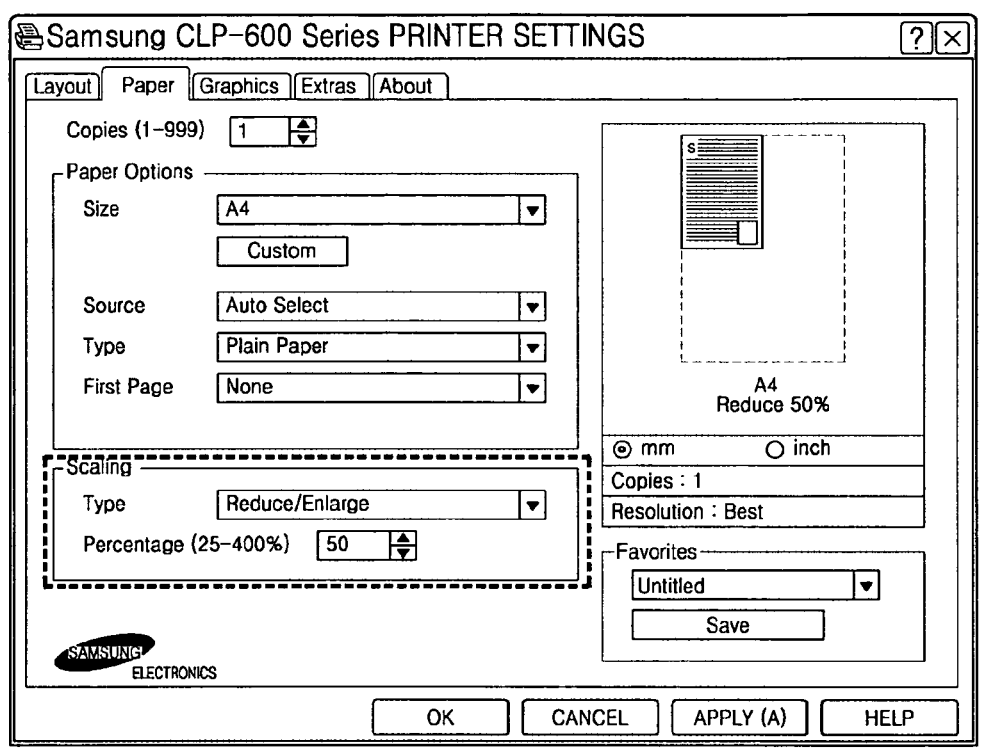
Figure 7C:
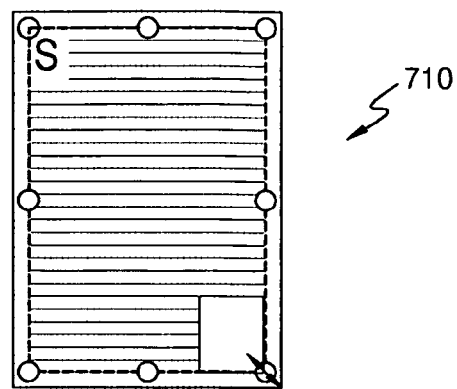
Figure 7C:
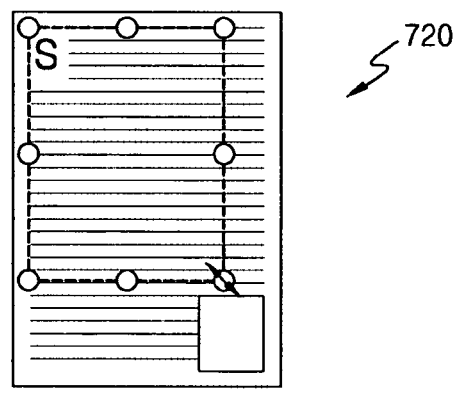
Figure 7C:
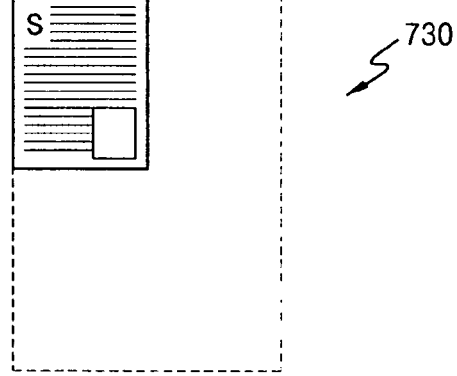

FIGS. 7A to 7C show examples of manipulating a preview image for changing a printing scale according to an exemplary embodiment of the present invention.

Referring to FIGS. 7A to 7C, the printing scale can be changed using a preview image displayed on a preview screen of a printer setting window shown in FIG. 7A 710. The preview image is activated when one of the four corners of the preview image is clicked, and then the printing scale can be changed to a desired scale by dragging the corner of the preview image 720.

When the mouse pointer is moved out of the preview image after the preview image is dragged to a desired printing scale, printing is performed according to the changed printing scale 730.

When the printing option is changed by manipulation of the preview image, the changed printing option is displayed on the printing option setting unit 310 of the printer setting window as shown in FIG. 7B. Referring to FIG. 7B, the printing scale is changed to 50%.

Figure 8A:
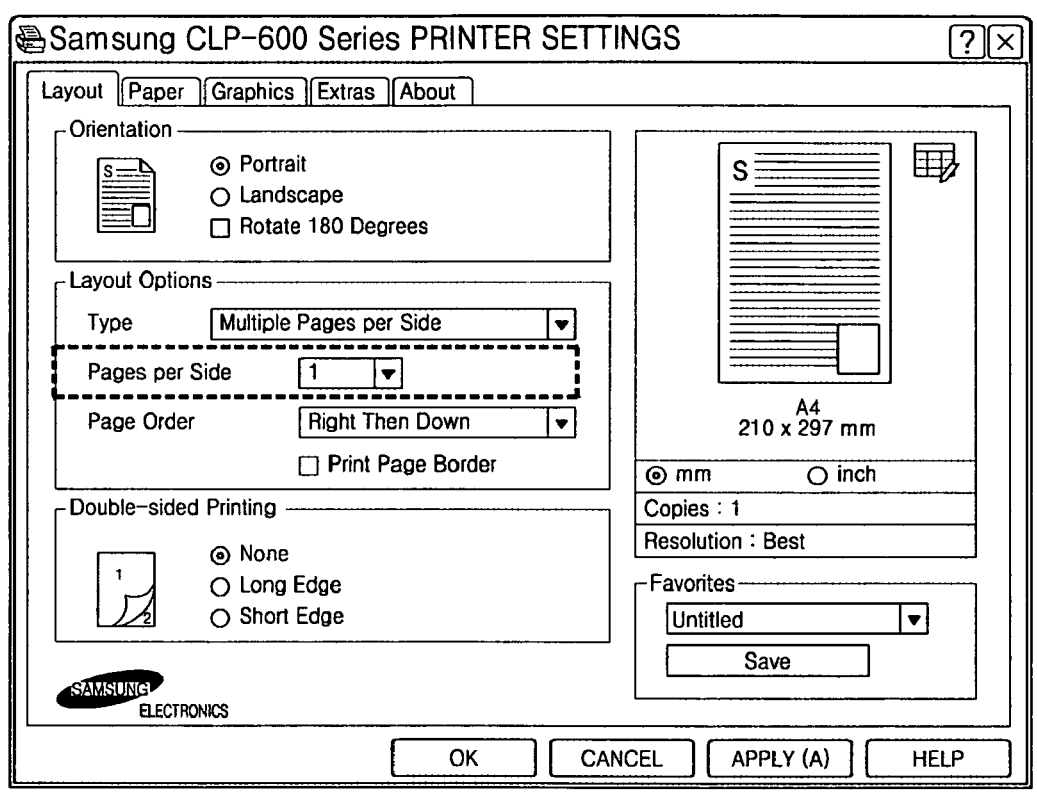
FIGS. 8A to 8C show examples of manipulating a preview image for setting an n-up printing option according to an exemplary embodiment of the present invention.
Figure 8B:
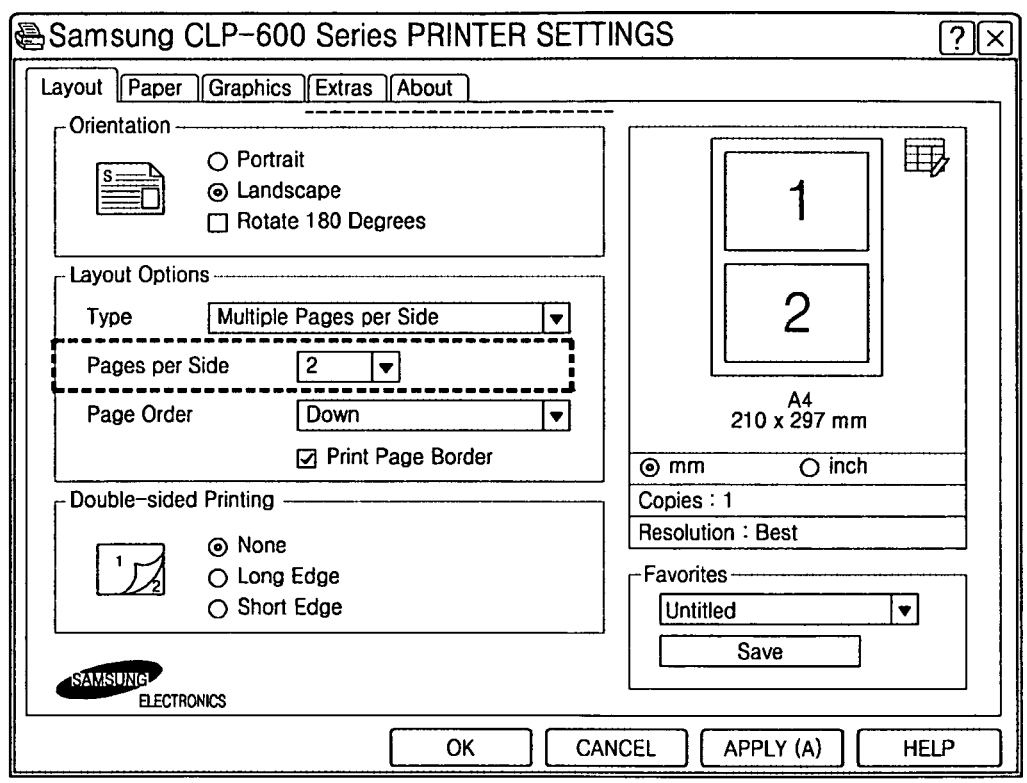
Figure 8C:
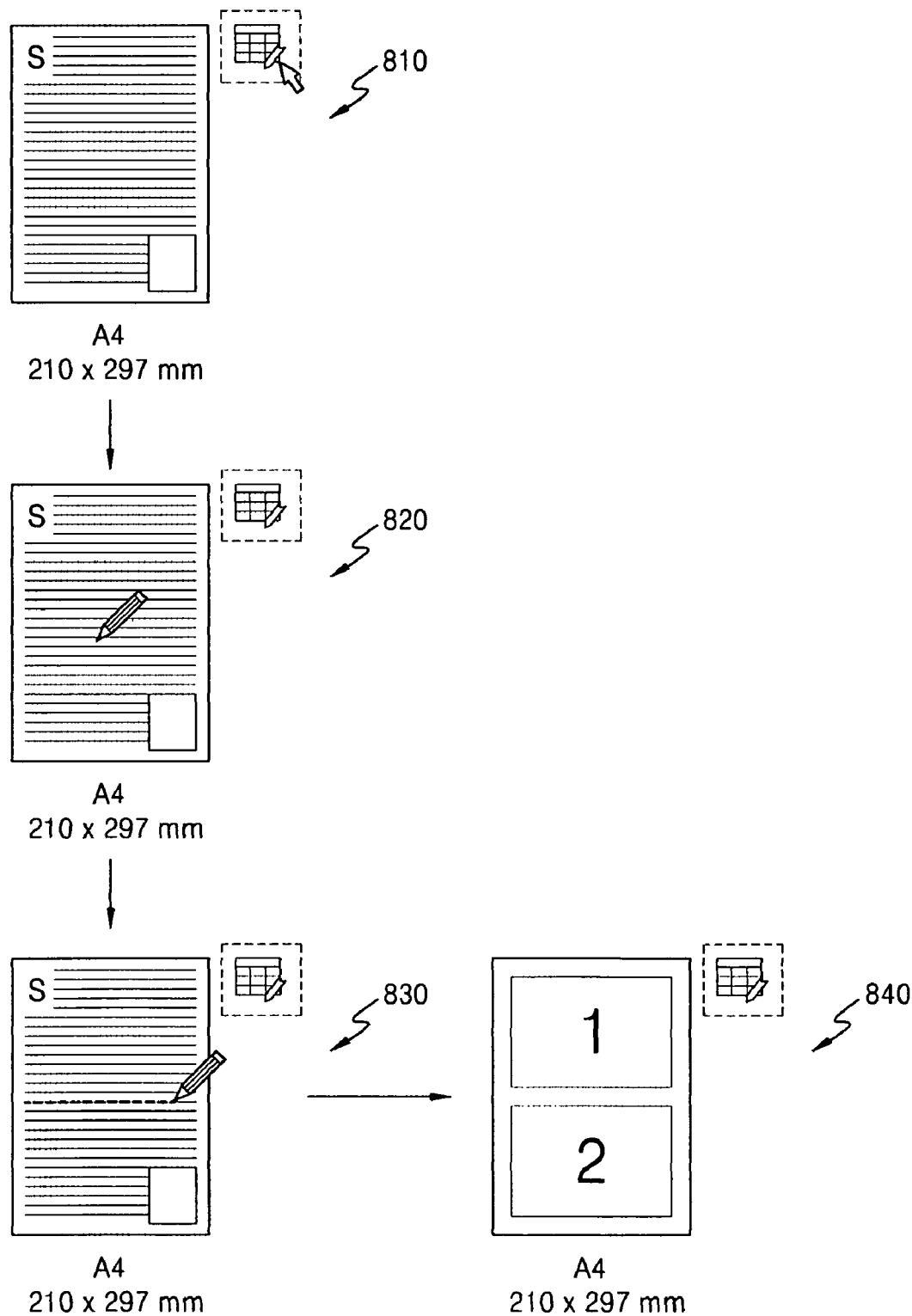

FIGS. 8A to 8C show examples of manipulating a preview image for setting an n-up printing option according to an exemplary embodiment of the present invention.

Referring to FIGS. 8A to 8C, a preview screen of a printer setting window shown in FIG. 8A is provided using a pen. To draw a line on a preview image displayed on the preview screen for printing with an n-up printing option, the pen provided on the preview screen is activated 810. The activated pen is moved to a desired position on the preview image 820. At the desired position on the preview image, a line is drawn using the activated pen according to the desired number of multiple pages to be printed under the n-up printing option 830.

When the printing option is changed by manipulation of the preview image, the changed printing option is displayed on the printing option setting unit 310 of the printer setting window as shown in FIG. 8B. Referring to FIG. 8B, a 2-up printing option is set for printing two pages on one sheet of paper 840.

Meanwhile, exemplary embodiments of the present invention can be written as computer programs and can be implemented in general-use digital computers that execute the programs using a computer readable recording medium. Examples of the computer readable recording medium include magnetic storage media (such as, ROM, floppy disks, hard disks, among others), optical recording media (such as, CD-ROMs, or DVDs). It is envisioned that other storage media such as carrier waves (e.g., transmission through the interne, etc.) can be utilized as an equivalent to a computer readable medium.

According to exemplary embodiments of the present invention, a preview image is manipulated according to desired printing settings, and printing options are set according to printing settings of the manipulated preview image. Therefore, even computer illiterate users can easily change and use more printing options using a simple interface.

While the present invention has been particularly shown and described with reference to exemplary embodiments thereof, it will be understood by those of ordinary skill in the art that various changes in form and detail may be made therein without departing from the spirit and scope of the present invention as defined by the appended claims and equivalents thereof.

What is claimed is:

1. A non-transitory computer readable medium storing executable computer program instructions which, when executed by a computer, cause the computer to perform a method comprising:
    displaying a printer driver user interface including a first region and a remaining region;
    displaying a plurality of pull-down menus in the first region to enable selection of printing options;
    receiving a user input via an operation of an input pointing device with one of the pull-down menus to change one of the printing options; and
    displaying a preview image in the remaining region of the printer driver user interface;
    wherein, when a user input is received via an operation of the input pointing device while a graphical pointer of the input pointing device is positioned in the remaining region to change N-up printing option and is not positioned to pull-down any one of the pull-down menus, the preview image displayed in the remaining region is changed to represent the changed N-up printing option, and
    the changed N-up printing option is reflected in one of the pull-down menus displayed in the first region.

2. The computer readable medium of claim 1, wherein the preview image comprises a symbolic representation of selected layout options.

3. The computer readable medium of claim 1, wherein the first region corresponds to a printing option setting region and the remaining region corresponds to an image preview region.

4. The computer readable medium of claim 3, wherein the method further comprises:
    when one of the user selectable printing options is changed via an operation of the input pointing device while the graphical pointer thereof is positioned in the printing option setting region, displaying a preview image in the image preview region corresponding to the changed printing option.

5. The computer readable medium of claim 3, wherein, when the preview image displayed in the image preview region is manipulated via an operation of the input pointing device with the graphical pointer thereof located within the image preview region, the preview image displayed in the image preview region is changed to display a different preview image that corresponds to a selected printing option.

6. The computer readable medium of claim 3, wherein the input pointing device comprises a mouse pointing device.

7. The computer readable medium of claim 3, wherein, when the image preview region is operated via the input pointing device to change a printing orientation from portrait to landscape, or vice versa, the preview image displayed in the image preview region is changed to represent the changed printing orientation.

8. The computer readable medium of claim 3, wherein, when the image preview region is operated via the input pointing device to change a printing paper size, the preview image displayed in the image preview region is changed to represent the changed paper size.

9. The computer readable medium of claim 3, wherein, when the image preview region is operated via the input pointing device to change a printing scale, the preview image displayed in the image preview region is changed to represent the changed printing scale.

10. The computer readable medium of claim 3, wherein an N-up printing option icon is displayed in the image preview region adjacent to the preview image to indicate that the N-up printing option is changeable via an operation of the input pointing device over the preview image displayed in the image preview region.

11. The computer readable medium of claim 3, wherein the user selectable printing options, displayed in the printing option setting region, comprise a first user selectable print option which is selectable via manipulation of a pull-down menu and a second user selectable print option which is selectable via operation of a toggle selector,
    wherein, if the first user selectable print option is changed from a first setting to a second setting, or vice versa, via the pull-down menu of the printing option setting region, the changed setting is reflected in the image preview region by changing an image displayed therein, and if the first user selectable print option is changed from the first setting to the second setting, or vice versa, via an operation of the input pointing device over the preview image displayed in the image preview region, the changed setting is reflected in the pull-down menu displayed in the printing option setting region, wherein, if the second user selectable print option is changed from a first setting to a second setting, or vice versa, via the toggle selector of the printing option setting region, the changed setting is reflected in the image preview region by changing an image displayed therein, and if the second user selectable print option is changed from the first setting to the second setting, or vice versa, via an operation of the input pointing device over the preview image displayed in the image preview region, the changed setting is reflected in the toggle selector displayed in the printing option setting region.

\* \* \* \* \*